United States Patent [19]

Dehm et al.

[11] Patent Number: 4,644,035
[45] Date of Patent: Feb. 17, 1987

[54] PROCESS FOR SULFONATING OF POLYMERS CONTAINING DICARBOXYLIC ACID CYCLIC IMIDE UNITS

[75] Inventors: David C. Dehm, Thornton; H. Franklin Lawson, Downingtown, both of Pa.

[73] Assignee: Atlantic Richfield Company, Los Angeles, Calif.

[21] Appl. No.: 677,655

[22] Filed: Dec. 3, 1984

Related U.S. Application Data

[63] Continuation-in-part of Ser. No. 547,304, Oct. 31, 1983.

[51] Int. Cl.$^4$ ............................................... C08F 8/36
[52] U.S. Cl. ................................................... 525/344
[58] Field of Search ........................................ 525/344

[56] References Cited

U.S. PATENT DOCUMENTS

| | | | |
|---|---|---|---|
| 3,615,531 | 10/1971 | Meyer | 430/ |
| 3,730,900 | 5/1973 | Perricone | 252/8.5 |
| 4,478,727 | 10/1984 | Turner | 252/8.5 |

*Primary Examiner*—Christopher Henderson
*Attorney, Agent, or Firm*—Dennis M. Kozak

[57] ABSTRACT

A process for producing sulfonated polymers containing styrene moieties and cyclic imide moieties comprises reacting a styrene/maleic anhydride copolymer with a primary amine to produce a polyimide and then subjecting the polyimide to sulfonation wherein both the imidization step and the sulfonation step are conducted in a solvent inert to both reaction steps, such as nitrobenzene.

10 Claims, No Drawings

PROCESS FOR SULFONATING OF POLYMERS CONTAINING DICARBOXYLIC ACID CYCLIC IMIDE UNITS

This application is a continuation-in-part of application Ser. No. 547,304 filed Oct. 31, 1983.

This invention relates to preparation of polymers useful in drilling fluids.

More specifically, this invention relates to preparation of certain maleimide-containing copolymers and terpolymers useful in water-base drilling fluid compositions used for drilling subterranean wells, typically oil and gas wells.

Drilling fluids are generally classified on the basis of their principal component. When the principal ingredient is a liquid (water or oil) the term "mud" is applied to a suspension of solids in the liquid. Water is the principal component of most drilling fluids and, accordingly, water-base drilling fluids or "water muds"are by far the most common.

Water-base drilling fluids vary widely in composition and properties and many have been classified based on their principal ingredients. Common classifications of water-base drilling fluids are fresh water, salt walter, low solid muds, spud muds, salt water muds, lime muds, gyp muds and CL-CLS muds.

In addition to water, these drilling fluids can comprise any number of known additives which perform various functions in the drilling fluid system. Among the most common additives are materials which increase density such as barite and galena and viscosifiers or thickening agents such as clays (usually bentonite) and asbestos.

Furthermore, many of the water-base drilling fluids are formulated to contain one or more polymeric additives which serve to reduce filtrations, stabilize clays, flocculate drilled solids, increase carrying capacity, emulsify, lubricate and the like. Among the most commonly employed polymeric additives are starches, guar gum, xanthan gum, sodium carboxy-methylcellulose (CMC), hydroxyethylcellulose (HEC), and synthetic water dispersable polymers such as acrylics and alkylene-oxide polymers.

Also well known and important for their ability to reduce flow resistance and gel development in clay-water muds are materials which are broadly referred to in the drilling fluid industry as "thinners".

Materials conventionally used as thinners are classified as plant tannins, polyphosphates, lignitic materials and lignosulfonates.

However, experience has shown that many of the materials which function as conventional thinners also have been found to perform other important functions, frequently of greater significance than improving the flow properties of the mud. Specifically, some have been found effective to reduce filtration and cake thickness, to counteract the effects of salts, to minimize the effect of water on the formations drilled, to emulsify oil in water, and to stabilize mud properties at elevated temperatures. Thus, the term "mud-conditioning agent" is often more appropriate than thinner and as used herein is understood to mean an additive which functions as a conventional thinner and also serves to stabilize mud properties at elevated temperatures.

Additionally, any number of known detergents, lubricants corrosion inhibitors, materials for control of loss of circulation surfactants and the like can be incorporated into water-base drilling fluid compositions.

Water-base drilling fluid compositions and additives to impart specific properties thereto are described in detail in Chapters 1, 2, and 11, of *Composition and Properties of Oil Well Drilling Fluids*, Fourth Edition, George R. Gray and H. C. H. Darley, Gulf Publishing Company.

Numerous additives which have been found to be effective to enhance the properties of water-base drilling fluids are taught in the patent literature. The following patents are representative.

U.S. Pat. No. 2,650,905 teaches the use of a sulfonated polystyrene in a water-based drilling fluid decreases the loss of fluid from the mud to the surrounding formation.

U.S. Pat. No. 2,718,497 teaches a drilling fluid containing a linear hydrocarbon chain polymer or copolymer of relatively high molecular weight, in which hydrophilic acid or acid forming groups are present, provides good fluid loss control.

U.S. Pat. No. 3,332,872 teaches that the use of a small amount of a copolymer of styrene and maleic anhydride in a drilling fluid provides effective thinning capability and viscosity control.

U.S. Pat. No. 3,730,900 teaches that a water mud containing a low molecular weight copolymer of styrene and maleic anhydride, exhibits good thermal stability and the ability to handle formation contamination while maintaining an acceptable mud rheology.

US. Pat. No. 4,268,400 teaches the reduction of filtrate from a drilling fluid by the utilization of a terpolymer of a monovalent alkali metal salt of acrylic acid, a hydroxy alkyl acrylate and acrylamide.

U.S. Pat. No. 4,284,517 teaches an oil recovery method by waterflooding an oil-containing formation with an aqueous solution of the reaction product of styrene, maleic anhydride and triethylammonium aniline disulfonate.

European Pat. No. 107,316 and Australian Pat. No. 19 052 relate to sodium styrene sulfonate -CO- sodium-N-(4-sulfophenyl)maleimide as an improve viscosity control additive for water-base drilling muds.

Additional additives and drilling fluid compositions are described in U.S. Pat. Nos. 3,125,517; 3,214,374; 3,236,769; 3,686,119; 3,709,819; 4,064,055; 4,230,586; 4,268,400; and 4,293,427.

U.S. Pat. No. 2,279,410 teaches preparation of a photographic film having a layer of resin formed by reaction of a resin having a maleic anhydride constituent with an amine.

U.S. Pat. No. 3,039,870 teaches preparation of antistatic copolymers of salts of N-sulfoalkyl-$\alpha,\beta$-unsaturated dicarboxylic imides.

U.S. Pat. No. 3,615,531 teaches a photographic material having an antistatic layer of a polymer obtained by sulfonating copolymers of N-phenyl maleic imide prepared by copolymerization of N-phenyl maleic imide or by imidization of a maleic anhydride copolymer.

U.S. Pat. No. 3,840,499 teaches preparation of dicarboxylic acid imide copolymers by reacting ammonia or amines with an aqueous suspension of a copolymer of a non-carboxylic monomer and an ethylenically unsaturated dicarboxylic acid, anhydride or half acid.

U.S. Pat. No. 4,450,261 teaches preparation of low molecular weight copolymers of styrene and maleic anhydride as well as sulfonated copolymers thereof using mercaptopropionic acid or methyl-3-mercaptopropionic acid as chain transfer agent.

The teachings of the above-identified disclosures are incorporated herein by reference thereto.

Thus, there is a long felt need in the drilling fluid industry for a material which displays dispersant (thinning) activity at elevated temperatures in the presence of formation contaminants. We have discovered that water-base drilling fluids containing a sulfonated polymer of recurring units of a maleimide monomer and a vinyl monomer contribute to satisfaction of that need.

Prior efforts to produce sulfonated polymers involve a first polymer synthesis and a subsequent sulfonation of the polymer. This two step procedure leads to considerable expense since the polyimide must normally be isolated and then purified prior to sulfonation because imidization solvents currently described in the literature are incompatible with most sulfonation agents. Both U.S. Pat. No. 3,615,531 and U.S. Pat. No. 4,284,517 describe sulfonating a polyimide and neither require a two step process. However, both suffer from a number of limitations. The reactions are carried out in aqueous caustic solutions and, accordingly, solubility problems arise. Also, the degree of polymer sulfonation is limited as is the distribution of sulfonate groups along the polymer chain.

The present invention provides an improved process to produce such sulfonated polymeric material or additive which is particularly suitable for use as a mud-conditioning agent for water-base drilling fluids. Water soluble salts of the additive produced by the improved method of this invention, when added to water-base drilling fluids, have been found to be particularly effective in thinning muds at temperatures exceeding 375° F. in the presence of formation contaminants such as formation solids, salts, various forms of calcium and carbon dioxide.

According to this invention, there is provided a method for producing a sulfonated polymeric additive for a water-base drilling fluid composition which additive is a polymer of recurring units of a maleimide monomer, recurring units of a vinyl monomer and, optionally, recurring units of a carboxyl-containing monomer and is produced by reacting a polymer having recurring maleic anhydride with a primary amine followed by sulfonation.

The method of this invention affords production of sulfonates of styrene/maleimide copolymers and styrene/maleimide/maleic acid terpolymers. The method involves the use of a high boiling chemically inert solvent which will permit the imidization of a styrene/maleic anhydride copolymer to proceed at a temperature above 120° C., preferably at about 140° C., and will not react with the sulfonating agent in a subsequent sulfonation of the polymer. Moreover, the solvent should be immiscible with water produced in the reaction and should facilitate removal of water from the reaction as, for example, a binary azeotrope of water and solvent. Solvents which are suitable are nitroaromatics, nitroparaffins and halogenated aliphatics.

The method of this invention avoids the need to isolate the polyimide prior to sulfonation and permits the entire polymer production and sulfonation in a single reaction vessel. The method also provides much higher levels of polymer sulfonation than prior one step processes.

In one embodiment of this invention, styrene/maleic anhydride copolymers are reacted with aniline to produce a styrene/N-phenylmaleimide copolymer or a styrene/N-phenylmaleimide/maleic anhydride terpolymer which is then sulfonated with an appropriate sulfonating agent such as sulfur trioxide.

The imidization and sulfonation of this process are conducted in a solvent which is chemically inert to both the imidization reaction and the subsequent sulfonation. The requirements to be met by a suitable solvent are:

1. high boiling point,
2. good solubility parameter for imide,
3. non-reactive to sulfonation conditions
4. low water solubility and/or readily permits water removal,
5. will not contribute to formation of stable emulsions during formation of a sulfonate salt, and
6. capable of being recycled.

It has been found that nitrobenzene, ethylene dichloride, trichloroethane and nitroparaffins are among the solvents which satisfy the above requirements.

The copolymer reactants of this invention are products of copolymerized vinyl monomers and cyclic anhydrides. Suitable vinyl monomers have the formula

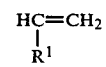

wherein $R^1$ is an alkyl group, a cycloaliphatic group, an aromatic group, an alkyl substituted aromatic group, an aryl substituted aromatic group, a condensed aromatic group and an alkyl or aryl substituted condensed aromatic group.

Examples of vinyl monomers which may be used are: styrene, alpha methylstyrene, para methylstyrene, nuclear methylstyrenes, ethylstyrene, isopropylstyrene, tert-butylstyrene, chlorostyrenes, dichlorostyrenes, vinylnaphthalene, indene, methylindenes, styrenes which contain sulfo groups, e.g., p-styrene sulfonic acid, ethylene, propylene, butylene, isoprene, vinyl acetate and its hydrolized from-vinyl alcohol in the polymeric material, vinyl propionate, vinyl butylate, vinyl isobutyl ether and the like, and their mixtures.

Preferred vinyl monomers are the vinyl aromatic monomers. Particularly suitable vinyl aromatic monomers are styrene, alpha methylstyrene, para methylstyrene, nuclear methylstyrenes, ethylstyrene, isopropylstyrene, tert-butylstyrene, vinylnaphthalene and the like and their mixtures.

Suitable cyclic anhydride monomer have the formula

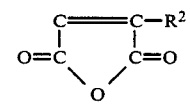

wherein $R^2$ is hydrogen or alkyl having 1 to 10 carbon atoms. Maleic anhydride is the preferred anhydride.

The copolymer or terpolymer reactants can be prepared by a suitable polymerization technique known to those skilled in the art. A particularly suitable polymerization technique for the formation of the copolymer of recurring units of the maleic anhdride monomer and vinyl monomer is conventional free radical polymerization in solution, in bulk or by suspension.

Copolymers of styrene and maleic anhydride have been found particularly suitable in the process of this invention are commercially available. Suitable styrene/maleic anhydride copolymers are available from ARCO Chemical Company, division of Atlantic Richfield Company under the designation SMA ® Resins. Particularly suitable for use are SMA ® 1000, SMA ® 2000, and SMA ® 3000.

SMA ® 1000 has a styrene to maleic anhydride ratio of 1/1 and a number average molecular weight as determined by vapor phase osometry of 1600.

SMA ® 2000 has a styrene to maleic anhydride ratio of 2/1 and a number average molecular weight as determined by vapor phase osmometry of 1700.

SMA ® 3000 has a styrene to maleic anhydride ratio of 3/1 and a number average molecular weight as determined by vapor phase osmometry of 1900.

Sulfonation of the polymers may be achieved using any conventional sulfonation method. Conventional sulfonating agents include chlorosulfonic acid, liquid sulfur trioxide, sulfuric acid and the like. The sulfonic acid groups on the polymers will typically be present in neutralized form as alkali metal salts, particularly as sodium or potassium salts and ammonium salts. The amount of or degree of sulfonation of the polyymeric additives of this invention is critical only to the extent that the polymers must be sulfonated to a degree effective to make them at least partially soluble in the water-base drilling fluid composition.

Polymers used in the process of this invention prior to sulfonation characteristically have a number average molecular weight as determined by vapor phase osmometry within the range of from about 1,000 to about 50,000. Preferably, the polymers will have a molecular weight of less than 15,000 and, most preferably, less than 5,000.

Moreover, the polymers can be composed of their recurring monomer units within wide mole percent ranges. Preferably, the copolymer will contain in mole percent from about 75 to about 25 recurring units of vinyl monomer and from about 25 to about 75 recurring units of maleic anhydride monomer.

Aside from well drilling fluids, the incorporation of an imide (e.g., succinimide) functionality into styrenic resins has been shown to be desirable in several other applications. The incorporation of the N-phenyl succinimide group has been of considerable interest as a result of the chemical inertness and improvement in thermal properties. Thus, improved methods to introduce an imide function into polymers are sought for both simplicity and economic considerations.

The general imidization of an anhydride-containing polymer with a primary amine is described in U.S. Pat. Nos. 3,615,531, 3,840,499 and 4,317,893, the teachings of which are incorporated herein by reference. The polymers produced using these methods are theoretically completely imidized but sometimes the copolymers may still contain recurring units of acid, anhydride or the half amide due to incomplete imidization. Complete imidization is quite difficult and a typical imidized polymer contains in mole percent from about 25 to about 75 recurring units of vinyl monomer, from about 5 to about 74 recurring units of maleimide and from about 1 to about 70 recurring units of carboxyl-containing monomer resulting from incomplete imidization.

Prior art imidization methods normally utilized an aqueous suspension of the anhydride polymer or a solution in a solvent forming a binary azeotrophe with water. The problems with an aqueous suspension include the detrimental effect of water on the imidization equilibrium and problems with product drying. The solution processes currently known, suffer from low conversion and long reaction times, in addition to the inherent product recovery problems associated with polymer isolation from solutions. The solvent removal problems presented by both methods is particularly troublesome if additional modification of the polymer is required.

In the prior art processes as well as the process of this invention, reacting an anhydride containing polymer with a primary amine results in the cyclic anhydride structure being converted to a cyclic imide. Suitable primary amine reactants are aliphatic or aromatic amines such as methyl, butyl, dodecyl, cyclohexyl, benzyl, phenylethyl or phenylbutyl amines, aniline, alkyl substituted analine with up to 25 alkyl carbon atoms, or polynuclear amines such as naphthylamine. Aniline is most preferred.

The amine reactant may be used in stoichiometric amounts based on the anhydride moiety in the polymer. However, it is preferred to use an excess of the stoichiometric amount to ensure complete conversion of the anhydride moiety to the desired imide or N-substituted imide. Use of less than stoichiometric amounts of the amine make it possible to prepare polymers containing both the uncyclized dicarboxylic acid corresponding to the anhydrid or the anhydride itself and the imide function.

It has been found that when the polymeric anhydride and the amine are reacted in the solvent system of this invention, a fast, high imide production can be achieved which further eliminates the need of expensive high pressure equipment and affords a simplified product recovery procedure. Furthermore, the improved process permits an efficient means for removal of water produced during the reaction. Also, the imide can be sulfonated in the same solvent system without prior isolation.

A preferred imidizing procedure according to this invention is to mix the polymeric anhydride in the solvent medium and then add the amine reactant. The system can be heated before or after addition of the amine reactant. By use of a reaction temperature corresponding to the reflux temperature of the system, the appropriate temperature level can be maintained and simultaneously the water of reaction can be easily removed by way of distillation into a Dean-Stark trap or similar apparatus. An imidization temperature of about 140° C. has been found to be adequate.

This process can be completed without the need of any catalyst and provides high conversions of maleic anhydride sites to imide (65% or more). Removal of the water of reaction by azeotroping improves the equilibrium conditions for imidization and results in a water-free product. This is particularly important for subsequent polymer modification by sulfonation.

With certain solvents, it may be desirable to add a lower boiling co-solvent for the purpose of azeotroping the water formed during the imidization reaction. In this embodiment, the co-solvent would boil at a lower temperature than the reaction solvent and would azeotrope water thereby removing the water at a lower temperature than a boiling point of the primary solvent. Thereafter, upon completion of the imidization reaction, the co-solvent could be removed by distillation leaving the imidized copolymer dissolved in the solvent. That mixture could then be subjected to sulfonation. A particularly suitable co-solvent for this purpose is xylene.

Where a high boiling solvent is used and water is not removed by the azeotrope procedure, water can be removed by evaporation under reduced pressure during the imidization reaction.

After completion of the imidization reaction, the crude product mixture is cooled to room temperature whereupon sulfonation can be conducted according to known procedures. For example, the crude reaction mixture can be mixed with sulfur trioxide and the mixture heated to about 65° C. After sulfonation is complete the sulfonated polymer can be recovered from the solvent by any suitable means such as removal of solvent by distillation or by converting the sulfonate groups to alkali metal salts or ammonium salts by use of an aqueous alkali metal base (e.g., hydroxide or carbonate) and then extracting the sulfonated polymer into the aqueous phase.

Having described the materials and methods of this invention, the following non-limiting examples serve to further demonstrate and illustrate the invention.

EXAMPLE I

Styrene-maleic anhydride copolymer SMA ® 1000 (40 grams) was dissolved in a solvent system containing 333 grams of nitrobenzene and 143 grams xylene. The solution was heated to 115° C. under a blanket of dry nitrogen, and treated with 16 grams of neat aniline. The temperature was increased until a mixture of water and xylene refluxed and reflux was maintained for 4 hours. The water/xylene azeotrope was distilled into a Dean-Stark trap during this period. At this point the Dean-Stark trap was drained and allowed to refill. This procedure was continued with increasing temperature until xylene no longer distilled from the flask (1 hr., 179° C). The mixture was cooled to room temperature and a 15 gram aliquot was removed. This was added to 30 grams of ether to precipitate the terpolymer. The terpolymer was characterized by combustion analysis and filtration and the terpolymer composition was determined to be:

| Monomer | Mole % | Weight % |
|---|---|---|
| Styrene | 50 | 37 |
| N—phenylmaleimide | 29 | 35 |
| N—phenyl-maleamic acid | 15 | 21 |
| Cumene | 6 | 6 |

This corresponds to approximately 65 mole % conversion of SMA anhydride units to imide units.

Half of the remaining 351 grams of terpolymer solution, was added to a solution of 15 grams of sulfur trioxide in 500 grams of nitrobenzene. The sulfonic acid of the terpolymer slowly crystallized from solution as the sulfonation proceeded. The rate of which the two solutions were mixed was adjusted to maintain a reaction temperature of 30° C. Upon completing the addition step, the slurry was heated to 65° C. for 1 hour. A 10% aqueous solution of sodium hydroxide was added until a pH of 7.5 was reached and the mixture was heated at 65° C. for 40 min. to extract the sulfonated polymer as its sodium salt. The aqueous extract was recovered and stripped to dryness. The terpolymer sulfonate was crushed to a fine powder and dried under vacuum to constant weight. An analysis of the product indicated a total sulfur content of 9.1 weight percent and a free sulfate content of 11.8 weight percent.

EXAMPLE II

A solution of 40 grams of SMA ®-1000 styrene-maleic anhydride copolymer was prepared in 476 grams of nitrobenzene and warmed to 70° C. under a blanket of dry nitrogen. The mixture was treated with 16 grams of aniline and then vacuum was applied to the reaction vessel (90 mm.) before gradually increasing the temperature. At 130° C., refluxing the solvent was observed and these conditions were maintained for 4 hours. A 16.3 gram aliquot of nitrobenzene and 2.94 grams of water were recovered during this process. The reaction mixture was cooled to room temperature and a 50 gram aliquot was removed and precipitated with ether. The solid polymer was dried (16 hr. at 100° C./20mm) and subjected to combustion analysis and filtration. The nitrogen content was found to be 4.3 weight percent and the carboxylic acid level was determined to be 1.86 meq/g. This indicated that approximately 39.5 mole percent of the anhydride sites were converted to imide, with the remainder present as amide acid.

A 230 gram portion of the nitrobenzene solution described above, was added to a solution of 14.5 grams of sulfur trioxide in 469 grams of nitrobenzene. The rate of polyimide solution addition was adjusted to maintain a reaction temperature of 30° C. The sulfonated product slowly crystallized from solution as the reaction proceeded. Upon completing the addition, the mixture was warmed to 65° C. for 45 minutes. The product was extracted by the addition of 140 grams of 10 weight percent aqueous caustic and mixing for 45 minutes. The aqueous phase was recovered and spray dried providing a tan powder. The sulfur content of the dry product was 11 weight percent and the sulfate level was 21 weight percent.

What is claimed is:

1. A process for preparing a sulfonated, imidized polymer from a non-sulfonated polymer having recurring cyclic carboxylic acid anhydride units comprising
   (a) dissolving the non-sulfonated polymer having cyclic carboxylic acid recurring units in an inert solvent and reacting the polymer with a non-sulfonated primary amine to convert at least a part of the anhydride moieties to imide moieties while removing the water byproduct from the reaction,
   (b) without isolating the resultant imidized polymer from the inert solvent and in the same solvent reacting the imidized polymer with a sulfonating agent, and
   (c) separating the sulfonated, imidized polymer from the inert solvent.

2. A process according to claim 1 wherein the inert solvent is nitrobenzene, ethylene dichloride, trichloroethane or nitroparaffins.

3. A process according to claim 1 wherein the anhydride units are maleic anhydride units.

4. A process according to claim 1 wherein the polymer having recurring cyclic carboxylic acid anhydride units is a styrene-maleic anhydride copolymer.

5. A process according to claim 1 wherein the primary amine is cyclohexyl amine, aniline, benzyl amine, phenyl ethyl amine, phenyl butyl amine or aniline substituted by alkyl having up to 25 carbon atoms.

6. A process according to claim 1 wherein the amine is aniline.

7. A process according to claim 1 wherein step a) is at the reflux temperature of the solvent.

8. A process according to claim 1 wherein water is removed in step (a) by azeotropic distillation.

9. A process according to claim 8 wherein water is removed as an azeotrope of a co-solvent having a lower boiling point than the inert solvent.

10. A process according to claim 1 wherein the co-solvent is xylene.

* * * * *